Patented Nov. 7, 1950

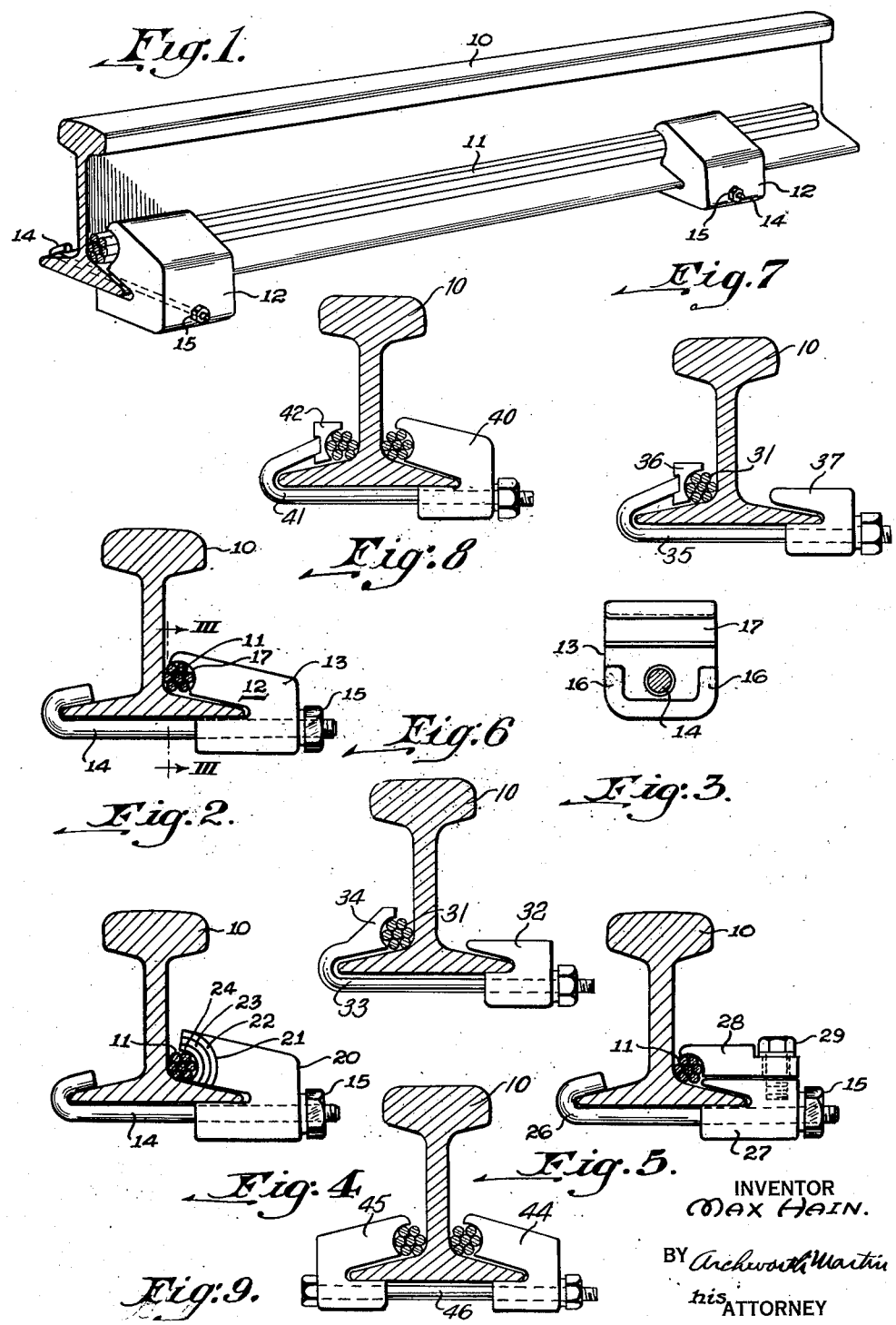

2,529,153

UNITED STATES PATENT OFFICE 2,529,153

CABLE CLAMP

Max Hain, Pittsburgh, Pa.

Application June 26, 1945, Serial No. 601,699

3 Claims. (Cl. 238—14.14)

My invention relates to cable clamps for connecting electrical conductor cables to third rail conductors, and the like, and is here shown as used in conjunction with a booster cable that assists a conductor rail in transmitting electric current to a traveling crane, for example. The invention may, however, be employed in connection also with ordinary rail bonds.

One object of my invention is to provide a clamp that is of simple form and will support and maintain a conductor cable in more effective engagement with a rail than do various forms of clamps or holders heretofore employed.

Another object of my invention is to provide a cable clamp of such form that it will snugly hold a booster cable in direct engagement with its associated rail and in somewhat flattened engagement therewith, when desired.

Still another object of my invention is to provide a clamp of such form that, while it is applied from the outer side of the rail, it can be used to hold the cable, against the inner side of the rail, or against either the inner side or the outer side.

In the accompanying drawings, Figure 1 is a perspective view showing the manner in which my clamps are positioned with respect to a rail and a booster cable; Fig. 2 is a sectional view of a rail and cable to which one of my clamps is applied; Fig. 3 is a view taken on the line III—III of Fig. 2; Fig. 4 shows a modification of the clamp of Fig. 2, adaptable to cables of various thicknesses; Fig. 5 shows still another modification of the structure of Fig. 2; Figs. 6 and 7 respectively show forms of clamps that are used in connecting cables to the inner side of a rail; Fig. 8 shows a clamp that may be used to connect cables to either the inner side or the outer side of a rail, or to both sides thereof, and Fig. 9 shows a modification of the structure of Fig. 8.

Referring first to Figs. 1 to 3, a conductor rail 10 on which a collector shoe (not shown) may slide in the usual manner, has a booster cable 11 connected thereto, at suitable points, by clamps 12. As shown in Fig. 2, these clamps comprise a clamping block 13, a hook bolt 14, and a nut 15. The lower or base portion of the block has a channel-like extension 16 beneath the rail 10. The edges of the channel abut against the under side of the rail. The bolt 14 lies in the channel and extends through a hole in the outer side of the block. The upper inner end of the block has a curved seating surface 17, for the cable 11.

It will be seen that when the parts are assembled as in Figs. 1 and 2, tightening of the nut 15 will move the block into position to move the cable snugly into its seat on the rail, so that it will have extended engagement with both the web and the base of the rail. The nut can obviously be drawn up to such extent that the cable will even be flattened somewhat against the web and the base.

In Fig. 4, I show a clamping structure that is similar to the clamp of Fig. 2, but wherein provision is made for fitting it to cables of various thicknesses. In this arrangement, the block 20 has a large recess 21 in its inner end, to receive curved filler plates 22, 23 and 24. For use with small cables, the plates will all be used. For somewhat larger cables, the plate 24 and perhaps also the plate 23 will be removed, while for the thickest cables all of the plates 22, 23 and 24 can be removed and the cable be engaged directly by the seat at 21.

Referring now to Fig. 5, I show an arrangement wherein a hook bolt 26 and a block 27 have an adjustable screw-threaded connection as in the connection of the hook bolt 14 and the block 13. In this structure however, the cable engagement element 28 is in the form of a separate block that is secured to the block 27 by a cap screw 29. One advantage of this construction is that cables can be removed and replaced simply by disconnecting the screws 29 of the various cable-holding blocks 28, while permitting the members 26 and 27 to remain in gripped engagement with the base of the rail. Another advantage is that blocks 28 having recesses of various radii which may be used so that cables of various thicknesses can be effectively held in place.

In Fig. 6, I show still another modification of the structure of Fig. 2. Ordinarily the cable-clamping blocks and the threaded connection between the hook bolt and the block are located at the outer side of a conductor rail, for convenience of access. In Fig. 6, I show means for holding a cable 31 against the inner side of a rail. In this case, a block 32 serves only to grip the rail base, and a hook bolt 33 is enlarged at 34 to form a seat for the cable 31 and to hold the cable against the rail.

In Fig. 7, I show a slightly different arrangement than that of Fig. 6 in that a hook bolt 35 serves to hold a cable-engaging block 36 against the rail when a rail-gripping block 37 is drawn into gripping engagement with the rail base. While the block 36 is a separately formed piece, it is held securely in place because the back-turned ends of the hook bolt enter a pocket or recess in the outer side of the block.

Referring now to Fig. 8, I show an arrangement which at one side of the rail has a cable-engaging block 40 that corresponds to the block 13 of Fig. 2 and wherein a hook bolt 41 supports a cable-engaging block 42 at the inner side of the rail, in like manner to the block 36. By this arrangement, the clamp structure can be employed to support a cable at either the inner side or the outer side of the rail, or can simultaneously support cables at both sides of the rail.

In Fig. 9, I show a modification of the structure of Fig. 8, in that it may be employed to support a cable at either the inner side or the outer side of a rail, or support cables against both sides of the rail. In this structure, I employ two blocks 44 and 45, both of which correspond to the block 13 of Fig. 2. Instead of using a hook bolt however, I employ a straight bolt 46 extending through both blocks, so that when the nut on the bolt is drawn up, the blocks will clamp cables against the rail. If a cable is omitted from either of the blocks, that block will simple make abutting engagement with the rail web or with the edge of the rail base.

It will be understood that suitable lock washers will be employed to hold the nuts against accidental loosening movement, and that in each case, the cable-clamping blocks can be drawn tightly enough to, in effect, slightly flatten the cables against the rail, thus making for effective electrical contact throughout a fairly large area. Also, the parts of various of the clamping structures are interchangeable with parts of the other forms, and the clamping structures are reversible on the rails.

While I refer in the claims to angles that are formed by the rail webs and their flanges, it will be seen that there is a slight curve or fillet where they join, and the cables have wider seating engagement than if there were a sharp angle at that point.

I claim as my invention:

1. A cable clamp for holding a cable in an angle formed in one side of a rail, comprising a clamping block engageable with the exposed side of the cable, a tension member adapted to lie beneath the rail and engageable against the opposite side of the rail, and a connection between said member and the block, for holding the block in position to clamp the cable against the sides of the said angle, the cable-engaging portion of the block being recessed to receive fillers of concavely-curved form which will partially embrace the exposed sides of cables of various thicknesses.

2. A rail bond for holding an electrical cable in an angle formed at the intersection of the base and the web of a track rail, comprising hook-shaped members extending around opposite edges of the rail base, a connecting member to extend beneath the rail, and a screw-threaded device on the connecting member, for drawing one of the hook-shaped members into gripping engagement with one edge of the rail base, and the other toward the rail web, one of the hook members having an extension thereon of block-like form in which there is a curved recess positioned to partly embrace the cable and press it into said angle, when said other hook member is drawn toward the rail base.

3. A rail bond for holding electrical cables in the angles formed at the intersection of the base and the web of a track rail, comprising hook-shaped members extending around opposite edges of the rail base, a connecting member to extend beneath the rail, and a screw-threaded device on the connecting member, for drawing the hook-shaped members into gripping engagement with the edges of the rail base, the hook members respectively having extensions thereon of block-like form in which there are curved recesses positioned to partly embrace the cables and press them into said angles, when the hook members are drawn against the edges of the rail base.

MAX HAIN.

REFERENCES CITED

The following references are of record in the file of this patent:

UNITED STATES PATENTS

| Number | Name | Date |
|---|---|---|
| 620,715 | Minich | Mar. 7, 1899 |
| 1,007,824 | Trosper | Nov. 7, 1911 |
| 1,090,190 | Bell | Mar. 17, 1914 |
| 1,121,939 | Mueller | Dec. 22, 1914 |
| 1,213,738 | Burge | Jan. 23, 1917 |
| 1,260,913 | Kixmiller | Mar. 26, 1918 |
| 1,387,996 | Menger | Aug. 16, 1921 |
| 1,522,647 | Perry | Jan. 13, 1925 |
| 1,550,073 | Holsing | Aug. 18, 1925 |
| 2,038,203 | Banks | Apr. 21, 1936 |
| 2,244,248 | Genter | June 3, 1941 |